Figure 1:
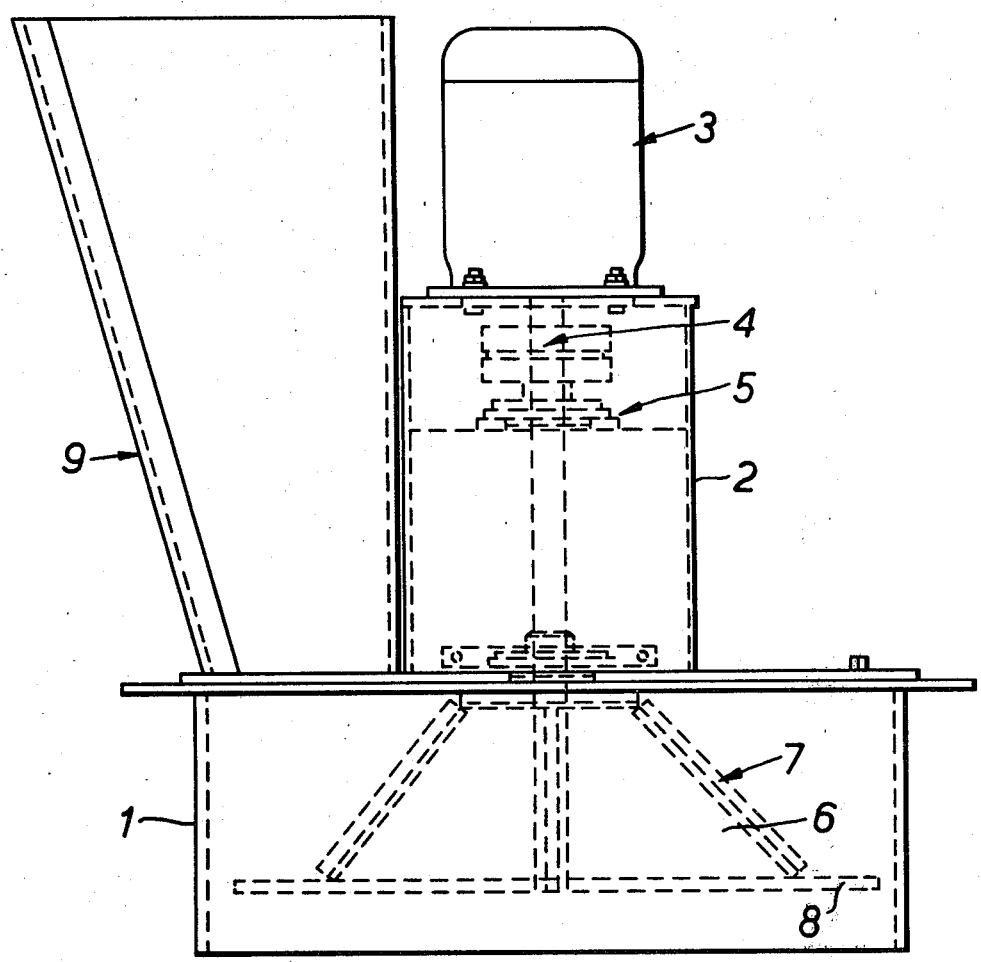

United States Patent [19]

Pack

[11] 4,391,413
[45] Jul. 5, 1983

[54] APPARATUS FOR BREAKING ARTICLES

[75] Inventor: Ernest A. Pack, Uxbridge, England

[73] Assignee: B.H.F. (Engineering) Limited, Middlesex, England

[21] Appl. No.: 197,237

[22] Filed: Oct. 15, 1980

[30] Foreign Application Priority Data

Oct. 16, 1979 [GB] United Kingdom ............... 7935961

[51] Int. Cl.³ ............................................ B02C 19/14
[52] U.S. Cl. ................................. 241/99; 241/185 A; 241/191
[58] Field of Search ............... 241/99, 191, 293, 169.1, 241/185 A

[56] References Cited

U.S. PATENT DOCUMENTS

| | | | |
|---|---|---|---|
| 2,519,198 | 8/1950 | Richeson | 241/293 X |
| 2,620,988 | 12/1952 | Tellier | 241/99 X |
| 3,017,127 | 1/1962 | Idzi | 241/293 X |
| 3,151,814 | 10/1964 | Morgan et al. | 241/99 |
| 3,587,984 | 6/1971 | Taylor | 241/191 X |

FOREIGN PATENT DOCUMENTS

| | | | |
|---|---|---|---|
| 603915 | 4/1960 | Italy | 241/169.1 |
| 351591 | 7/1931 | United Kingdom . | |
| 712299 | 7/1954 | United Kingdom . | |
| 973676 | 10/1964 | United Kingdom . | |

Primary Examiner—Willie G. Abercrombie
Attorney, Agent, or Firm—Cushman, Darby & Cushman

[57] ABSTRACT

An article breaking device, particularly a glassware breaking device for making cullet, is described. The articles to be broken pass down a chute into a downwardly open chamber. Within the chamber is a rotating member which is not circular in horizontal cross-section and which is rotated at high speed around a vertical axis. The articles to be broken impact on the member, are broken and the broken pieces fall out of the open base of the chamber. The rotating member is preferably frustoconical with a plurality of vertically running external ribs and a plurality of horizontally extending blades.

5 Claims, 3 Drawing Figures

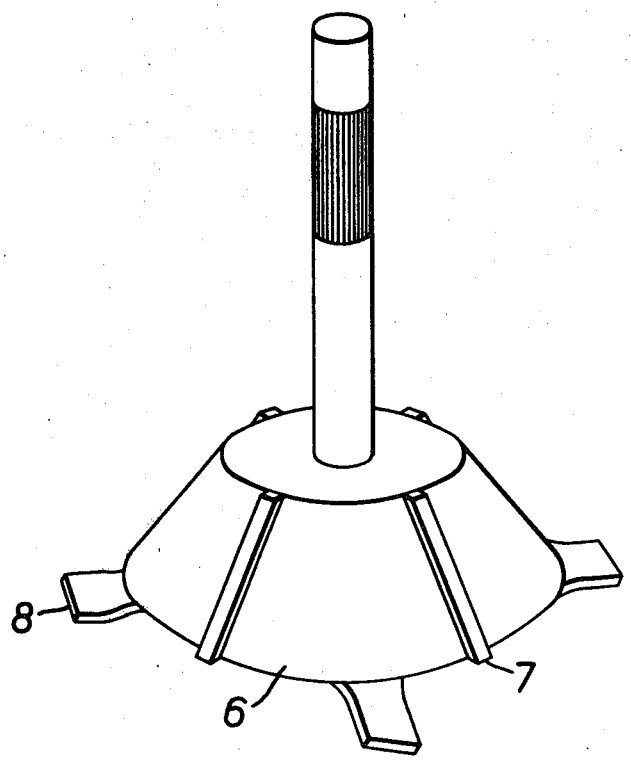

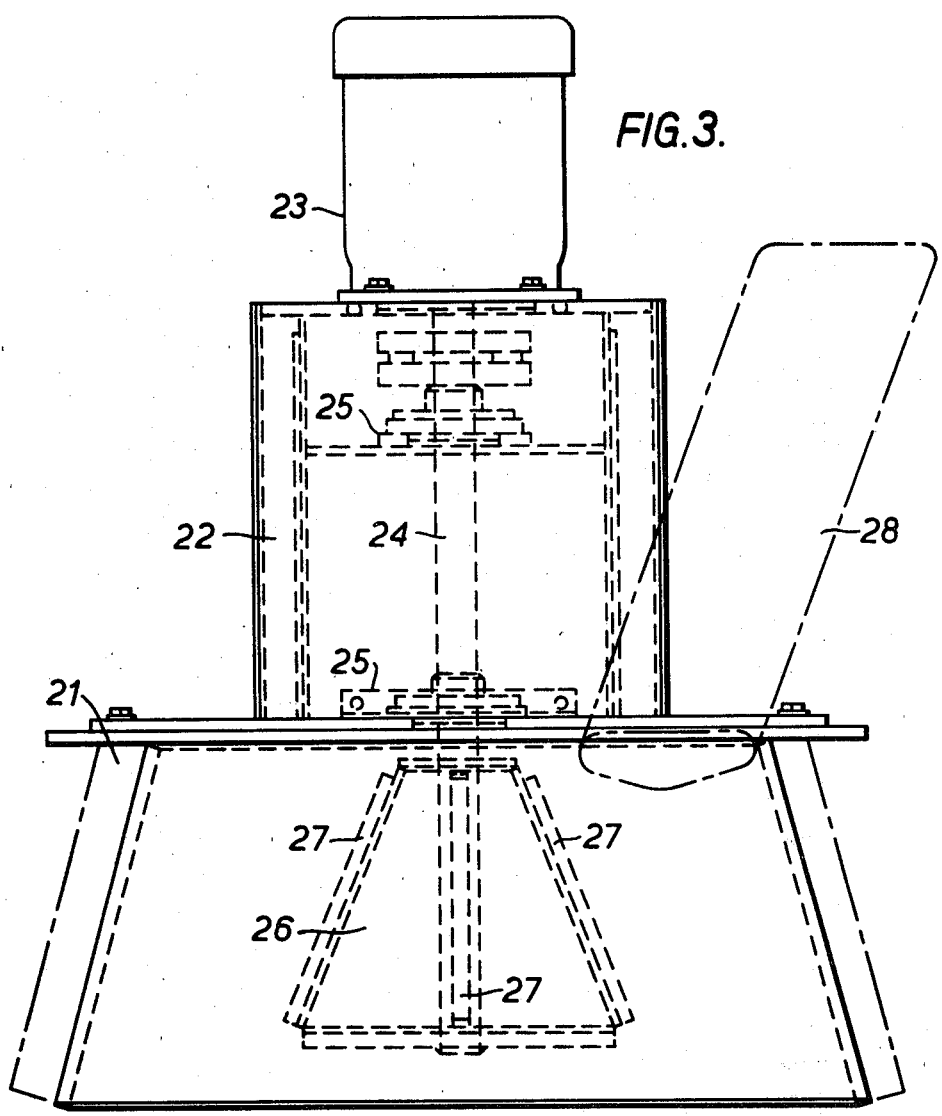

APPARATUS FOR BREAKING ARTICLES

This invention relates to apparatus for breaking articles, particularly of glass.

In order to recycle glass it is necessary first to break articles such as jars, bottles and the like to relatively small size pieces, then called cullet, whereafter it can be handled satisfactorily. It is desirable to break glass articles to cullet of a relatively even size, rapidly and safely and with a relatively low expenditure of energy.

According to the present invention there is provided apparatus for fracturing articles consisting of an upwardly inwardly tapering member of non-circular horizontal cross-section mounted for rotation about a vertical axis, means for rotating the member about the vertical axis and means for feeding articles to be broken to impact against the rotating member.

Such apparatus must naturally be mounted at a sufficient height above a space that the broken pieces fall downwardly away from the rotating member.

Such apparatus is particularly useful for breaking glassware to form cullet. In such a case, the rotating member and the guide for feeding the articles to be broken are conveniently mounted on a downwardly open housing which may be located over e.g. a skip in which the cullet collects.

Suitably the glassware is fed to the apparatus down a chute which opens out towards the rotating member to direct the glassware issuing from the chute on to the rotating member.

Preferably the rotating member is driven from vertically above, conveniently by an electric motor. The speed of rotation of the rotating member when the device is in use is preferably 500 to 1500 revolutions per minute, and the rotating member may be conveniently attached directly to the output drive shaft of an electric motor i.e. without intermediate gearing.

The non-circular external horizontal section of the rotating member may vary widely in shape but is preferably of relatively simple and convenient shape. We have found that a particularly effective shape for the manufacture of cullet consists of a frustoconical base having four raised ribs equiangularly spaced about its periphery and set in radial planes relative to the axis of rotation.

Suitably the rotating frustoconical member may be relatively small compared with the housing in which it is mounted. In this way air turbulence within the housing is kept to a minimum. If air turbulence is too great glass fines may be blown out of the housing. However preferably the base of the frustoconical member has one or more blades extending generally horizontally from its base. These blades may be set at an angle such that on rotation they produce a downward draught again to prevent dust.

The invention is further illustrated by way of example in the accompanying drawings wherein FIG. 1 shows an embodiment of apparatus according to the invention, FIG. 2 is a perspective view of the rotating member of the apparatus of FIG. 1, and FIG. 3 shows a second embodiment of apparatus according to the invention.

Referring to FIGS. 1 and 2, apparatus for breaking glassware to form cullet, which may be installed e.g. adjacent the cold end of an annealing lehr in a glass container production line, consists of a downwardly open housing 1 on the roof of which is mounted a bearing housing 2 on which in turn is mounted an electric drive motor 3. The output shaft 4 of drive motor 3 which is mounted in bearings 5 bears on its lower end a generally conical member 6 having four raised ribs 7 thereon. In addition extending from the base of conical member 6 are mounted four blades 8. The blades 8 are set at an angle such on rotation they produce a downwardly directed draught.

In the ceiling of casing 1 is a generally square aperture surmounted by a square section chute 9 down which bottles, jars and the like to be rendered to cullet may be dropped.

In use the rotatable member 6 is driven at a speed of 750 rpm and ware to be broken dropped through chute 9. It impacts on the rotating member and is broken by contact therewith and/or by the impact of the next following rib 7 or blade 8. Cullet drops out of the open bottom of casing 1 e.g. into a skip or onto a pile below.

FIG. 3 of the accompanying drawings shows apparatus for fracturing articles of generally similar construction to that of FIGS. 1 and 2 but of somewhat lower capacity. Thus the apparatus comprises a housing 21 on the roof of which is mounted a bearing housing 22 on which in turn is mounted an electric drive motor 23. The output shaft 24 of drive motor 23 which is mounted in bearings 25 bears on its lower end a generally conical member 26 having four raised ribs 27 thereon. Conical member 26 is narrower than member 6 of the embodiment of FIGS. 1 and 2.

In the ceiling of casing 21 is a generally triangular aperture surmounted by a triangular section chute 28 down which bottles, jars and the like to be rendered to collet may be dropped. The triangular shaped chute has the advantage of ensuring good alignment of the glass to the rotating member for various article diameters. However it is of generally low capacity and unable to cope for example with surges of conveyor loading.

The apparatus of FIG. 3 is used in the same way as that of FIGS. 1 and 2.

I claim:

1. Apparatus for fracturing glassware into cullet comprising: an upwardly and inwardly tapering impact member of noncircular horizontal cross-section mounted for rotation in a given direction about a vertical axis, said impact member including generally vertically extending ribs which have side surfaces facing generally in said given direction; a housing having a side wall with a generally smooth inner surface, said side wall surrounding and horizontally spaced from said impact member and extending downwardly beyond the lower edge of said impact member whereby a generally annular space is formed between said side wall and the lower edge of said impact member; means for rotating said impact member about said vertical axis in said given direction; and glassware feed means including a guide chute having a guide surface inclined downwardly and inwardly toward the side of said impact member for directing glassware issuing from the chute onto the side of said impact member, the arrangement of impact member, housing side wall and chute being such that the glassware is fractured into cullet upon contact with said impact member and falls downwardly away from said impact member and through said generally annular space.

2. Apparatus as in claim 1 wherein said housing is open in a downward direction and wherein said feed means is mounted on said housing.

3. Apparatus as in claim 1 wherein said means for rotating said impact member is located vertically above said impact member.

4. Apparatus as in claim 1 wherein said impact member is generally frustoconical in shape.

5. Apparatus as in claim 4 wherein said impact member has at least one blade extending generally horizontally from its base, the blade being set at an angle such that on rotation it produces a downward draught.

* * * * *